(12) United States Patent
Ogata

(10) Patent No.: US 6,473,200 B1
(45) Date of Patent: Oct. 29, 2002

(54) IMAGE FORMING APPARATUS METHOD

(75) Inventor: Nobuhiko Ogata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/221,143

(22) Filed: Dec. 28, 1998

(30) Foreign Application Priority Data

Dec. 26, 1997 (JP) .............................................. 9-359830
Dec. 14, 1998 (JP) .......................................... 10-354523

(51) Int. Cl.[7] .............................................. H04N 1/387
(52) U.S. Cl. ........................ 358/1.9; 358/450; 358/502; 283/901
(58) Field of Search ................................ 358/448, 450, 358/452, 540, 1.9, 1.14, 502; 283/901, 902; 399/366

(56) References Cited

U.S. PATENT DOCUMENTS 5,257,119 A  * 10/1993  Funada et al. ............... 358/450
5,592,305 A  *  1/1997  Iwadate et al. ............. 358/450

* cited by examiner

*Primary Examiner*—Thomas D. Lee
(74) *Attorney, Agent, or Firm*—Fitzpatrick, Cella, Harper & Scinto

(57) ABSTRACT

An image forming apparatus for forming an image in accordance with an input image on a recording material includes generating means for generating a predetermined pattern; superimposing means for superimposing the predetermined pattern on an input image; forming means for forming on the recording material the image superimposed with the predetermined pattern by the superimposing means; a controller for controlling an amount applied on the recording material of the predetermined pattern in accordance with the recording material.

28 Claims, 13 Drawing Sheets

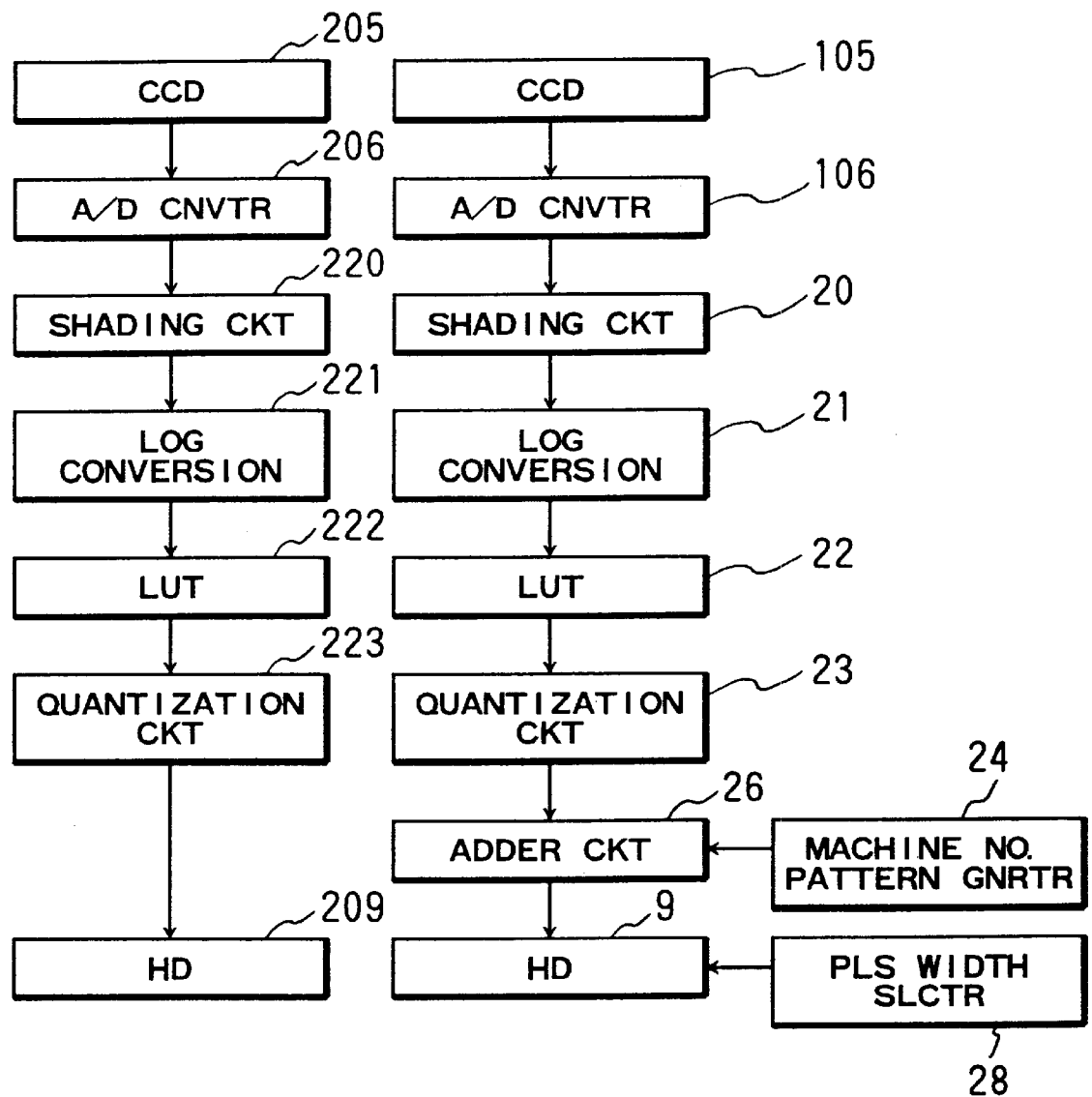
F I G. 11

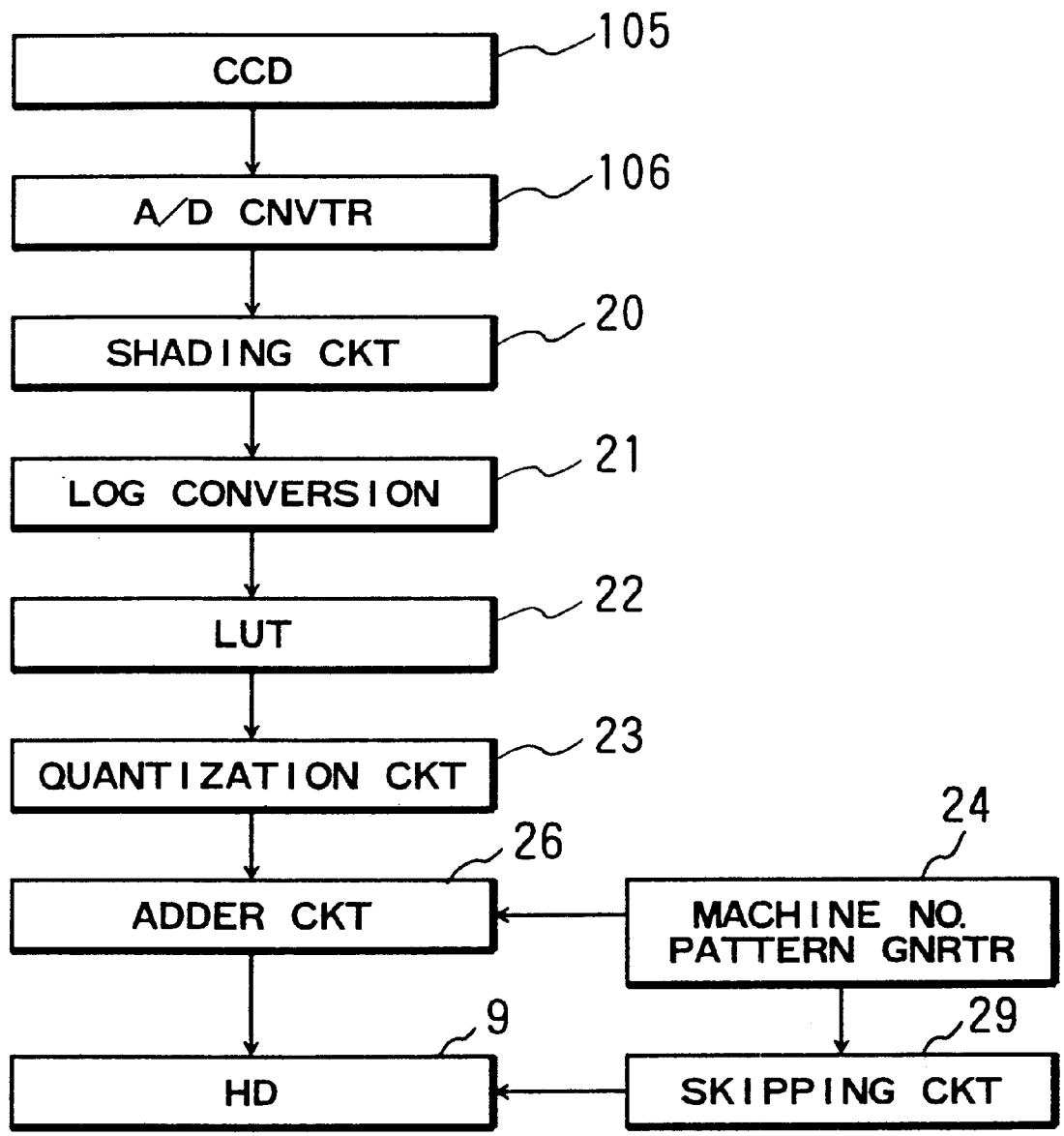
F I G. 13

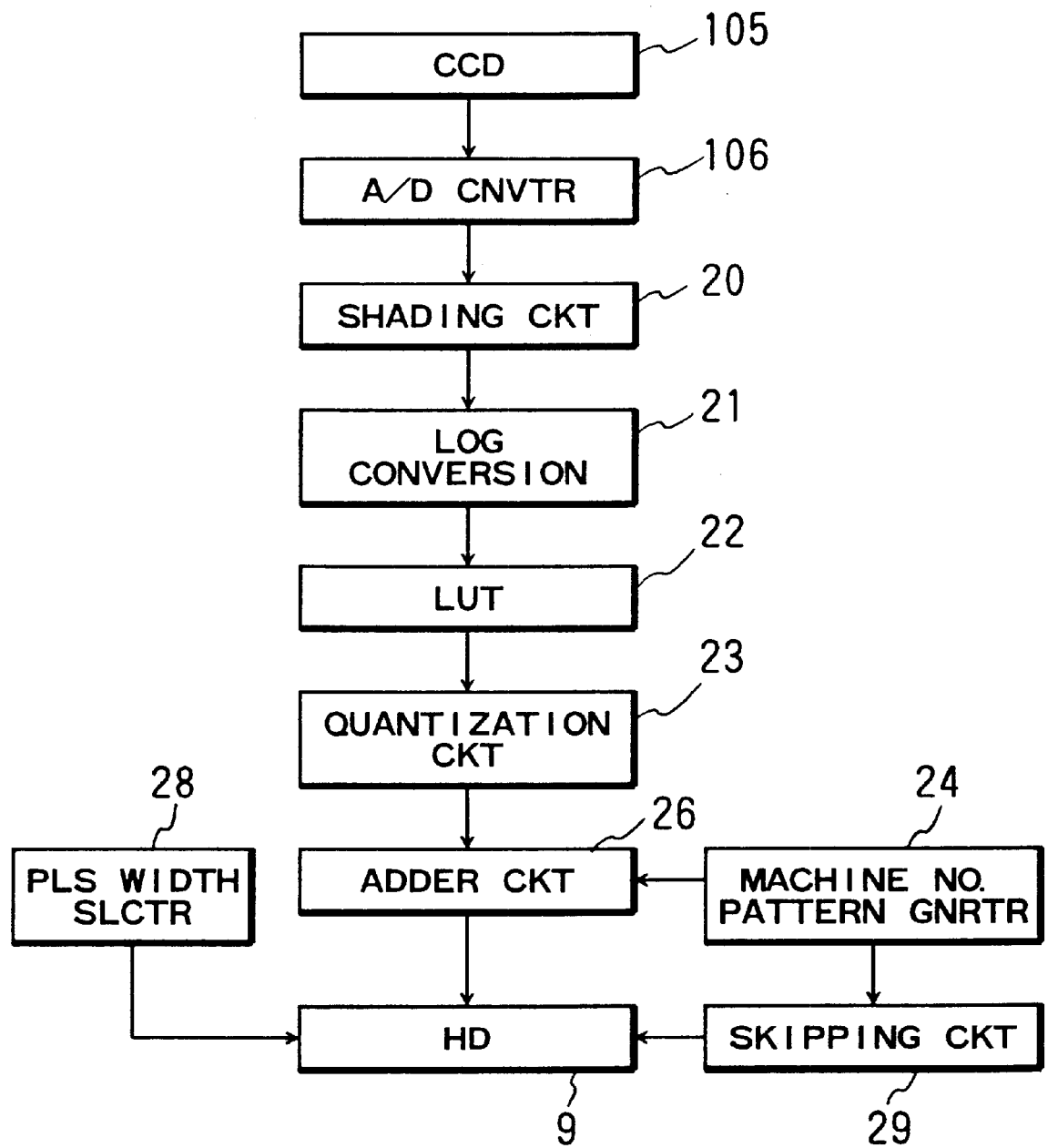
F I G. 15

IMAGE FORMING APPARATUS METHOD

FIELD OF THE INVENTION AND RELATED ART

The present invention relates to an image forming apparatus and an image forming method. For example, it relates to an image forming apparatus for forming a color image on a piece of recording medium, and an image forming method used with such an image forming apparatus.

A color image forming apparatus is provided with various measures for preventing the apparatus from being used to forge a certain type of original, for example, paper money, securities, and the like. One of such measures is to make it possible to identify the apparatus used for forgery. This can be realized by fixing a color image forming apparatus so that when a copy is produced by the apparatus, a coded pattern, which is specific to the apparatus, and inconspicuous to the naked eye, is overlaid across the copy, with a predetermined interval.

If an image forming apparatus fixed in the above described manner is used to forge securities, the identify of the apparatus used for the forgery, that is, a very effective clue for tracing the forger, can be easily revealed by reading the forgery with the use of a reading apparatus which extracts the code specific to the apparatus. Further, providing an image forming apparatus with such a function is effective to prevent the apparatus from being used for forgery, which is the secondary benefit of such provision.

However, there is a problem in this measure. That is, in the case of an ink jet recording system, the size and shape of a dot formed on a sheet of recording medium by an ink droplet drastically changes depending on the type of recording medium. For example, if an apparatus identification code, or coded pattern, is overlaid with a low density as disclosed in Japanese Laid-Open Patent Application No. 113107/1994, U.S. Pat. No. 5,557,416, or the like, the coded pattern sometimes becomes conspicuous to the naked eye, that is, can be recognized without the use of an apparatus which passes the light in a specific wave length range, and therefore, image quality becomes drastically inferior.

Further, when an image is formed with the use of an ink jet recording system, which is a binary recording system, control can be exercised only at the level of each dot. Therefore, if an apparatus identification pattern is improperly overlaid, image quality is drastically affected. For example, in the case of paper produced specifically for ink jet recording, that is, paper coated with an ink absorption layer, the bleeding which occurs as an ink droplet lands on recording medium is very small, and therefore, a dot with a sharp edge, which is conspicuous to the naked eye, is formed.

On the other hand, when an image is formed on a sheet of ordinary paper, that is, paper which is not coated with the ink absorption layer, ink spreads along the paper fibers as an ink droplet ejected from a recording head lands on the paper, and therefore, a dot with an indistinct edge is formed. Thus, when an image, inclusive of the aforementioned apparatus identification pattern, is formed on a sheet of ordinary paper, it takes a longer time to identify the apparatus with the use of the aforementioned reading instrument which passes only the light with a specific spectrum range, or it is rather difficult to obtain the apparatus identity.

SUMMARY OF THE INVENTION

The present invention is made in consideration of the above described shortcomings of the conventional methods.

Thus, the object of the present invention is to provide an image forming apparatus capable of recording a predetermined code, in an appropriate size, and a recording method effectively usable with such an image forming apparatus.

Another object of the present invention is to provide an image forming apparatus capable of properly recording a predetermined code regardless of the type of recording medium, and a recording method effectively usable with such an image forming apparatus.

The present invention made for the purpose of accomplishing the above described objects is characterized in that an image forming apparatus for forming an image on a piece of recording medium in response to the image formation signals inputted into the apparatus comprises:

means for generating predetermined patterns;

means for adding to the inputted image formation signals for the primary image, the image formation signals of one of the predetermined patterns generated by said pattern generating means;

means for forming an image, inclusive of the selected predetermined pattern, on a piece of recording medium, in response to the image formation signals compiled by said adding means; and means for controlling the amount of ink ejected per ejection to form the selected pattern generated by said pattern generating means, in accordance with the type of the recording medium.

Further, the present invention is characterized in that an image forming method for forming an image on a piece of recording medium in response to the image formation signals inputted into the apparatus comprises:

a step for generating predetermined patterns;

a step for adding to the inputted image formation signals for the primary image, the image formation signals of one of the predetermined patterns generated by said pattern generating means;

a step for forming an image, inclusive of the selected predetermined pattern, on a piece of recording medium, in response to the image formation signals compiled by said adding means; and a step for controlling the amount of ink ejected per ejection to form the selected pattern generated by said pattern generating means, in accordance with the type of the recording medium.

Further, the present invention is characterized in that an image forming apparatus for forming an image on a piece of recording medium in response to the image formation signals inputted into the apparatus comprises:

means for generating predetermined patterns;

means for adding to the inputted image formation signals for the primary image, the image formation signals of one of the predetermined patterns generated by said pattern generating means;

means for forming an image, inclusive of the selected predetermined pattern, on a piece of recording medium, in response to the image formation signals compiled by said adding means; and means for controlling said image forming means so that the selected predetermined pattern is formed twice or more times across a piece of recording medium, depending upon the type of the recording medium.

Further, the present invention is characterized in that an image forming method for forming an image on a piece of recording medium in response to the image formation signals inputted into the apparatus comprises:

a step for generating predetermined patterns;

a step for adding to the inputted image formation signals for the primary image, the image formation signals of one of the predetermined patterns generated by said pattern generating means; and a step for forming an image, inclusive of the selected predetermined pattern, on a piece of recording medium, in response to the image formation signals compiled by said adding means;

wherein the selected predetermined pattern is recorded twice or more times across the piece of recording medium, depending upon the type of the recording medium.

According to the above described structure, the amount by which ink is ejected to form the pattern to be overlaid can be altered by controlling the dot matrix, and the dot diameter.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 11 is a block diagram for the image processing operation in the fifth embodiment.

FIG. 13 is a block diagram for the image processing operation in the seventh embodiment.

FIG. 15 is a block diagram for the image processing operation in the eighth embodiment.

DESCRIPTION OF THE PREFERRED EMBODIMENTS

Hereinafter, a preferable embodiment of the present invention will be described with reference to the appended drawings. In the following embodiments, the present invention is described with reference to a copying machine (full-color image forming apparatus). However, the application of the present invention is not limited to a copying machine. It is obvious that the present invention is applicable various other image forming apparatuses.

Embodiment 1

Hereinafter, an embodiment of the present invention will be described with reference to a full-color image forming apparatus which employs an ink jet system. Of course, the present invention is also effectively applicable to an image forming apparatus which employs an image forming method such as an electrophotographic system, a silver salt photographic system, a thermal transfer system, a sublimation system, or the like.

Figure 1:
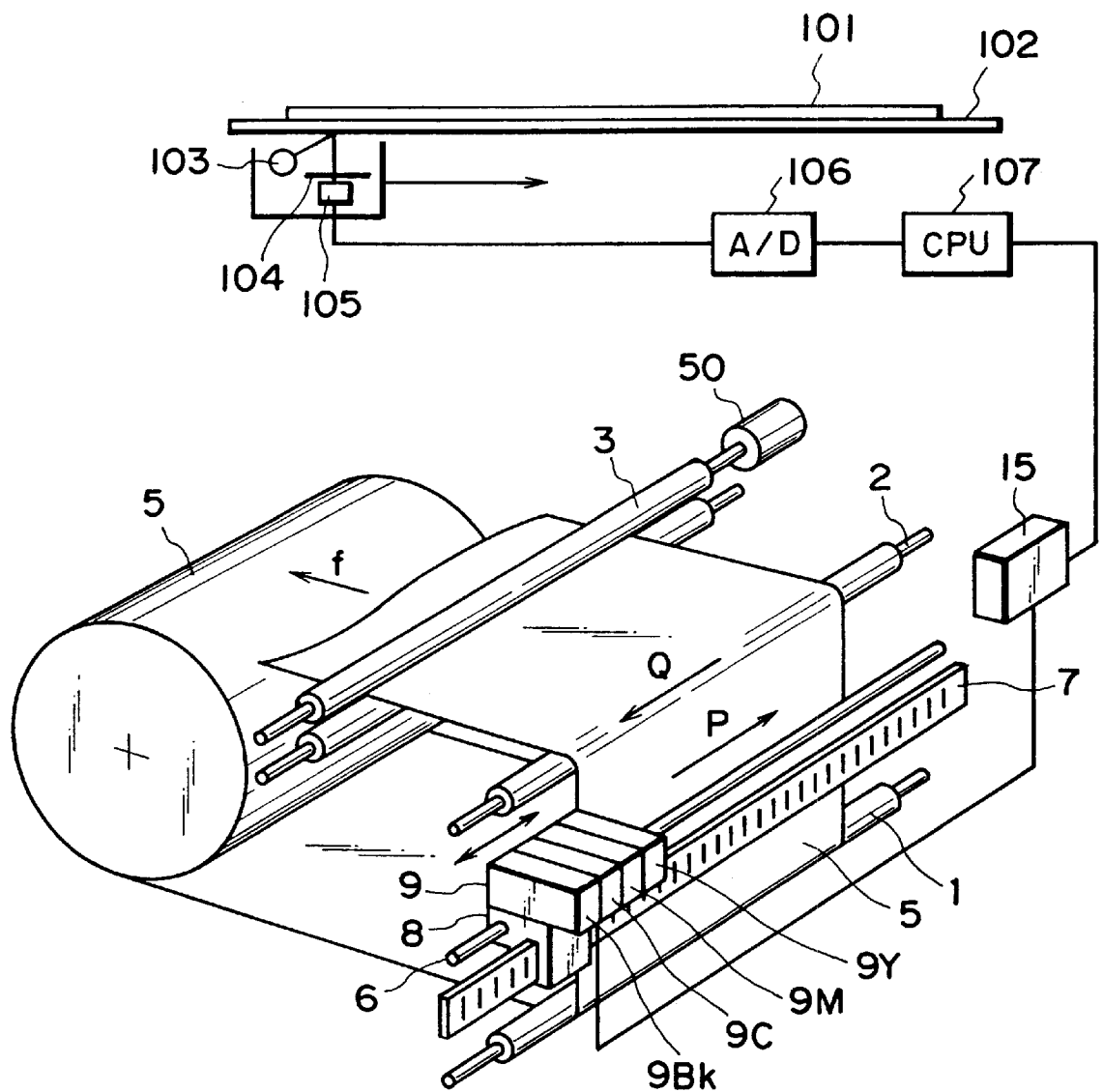
FIG. 1 is a schematic drawing which depicts the scanning action carried out to form a color image, in the first embodiment of the present invention.

FIG. 1 is a schematic drawing which depicts the scanning action carried out to form a color image, in the first embodiment of the present invention. The image of an original 101, placed on an original placement glass platen 102, is focused onto a CCD by an optical lens 104, being converted into image signals in accordance with the amount of light received by the CCD. The image signals are converted into digital signals by an A/D converter 106. Then, the digital signals are processed for image formation by a CPU, and are sent to recording heads 3C, 3M, 3Y or 3K, as a part of the recording data.

A roll of recording medium 5 is extended around conveyer rollers 1 and 2, and is fed through a pair of conveyer rollers 3, being pinched by the rollers 3. As a motor 50 for moving the recording medium 5 in the secondary scanning direction is driven, the recording medium 5 is conveyed in the direction indicated by an arrow mark f. Across the recording medium 5, guide rails 6 and 7 are disposed in parallel to the surface of the recording medium 5, and a recording unit 9 mounted on a carriage 8 is caused to move leftward (P) or rightward (Q) in a manner to scan the surface of the recording medium 5. On the carriage 8, four recording heads assigned one for one to yellow, magenta, cyan and black colors are mounted, along with four corresponding color ink containers. The recording medium 5 is intermittently sent out by the length equal to the width of each image segment which the recording head 9 prints on the recording medium 5 as it is moved in the primary scanning direction. The recording head 9 is caused to scan the surface of the recording medium 5 in the direction P while the recording medium 5 is kept static. As the recording head 9 is caused to scan, it ejects ink droplets in response to the quantified image formation signals sent to the recording head 9 from the aforementioned CPU 107. As a result, an image is recorded.

Next, the operations which the above structure carries out will be described.

Figure 2:
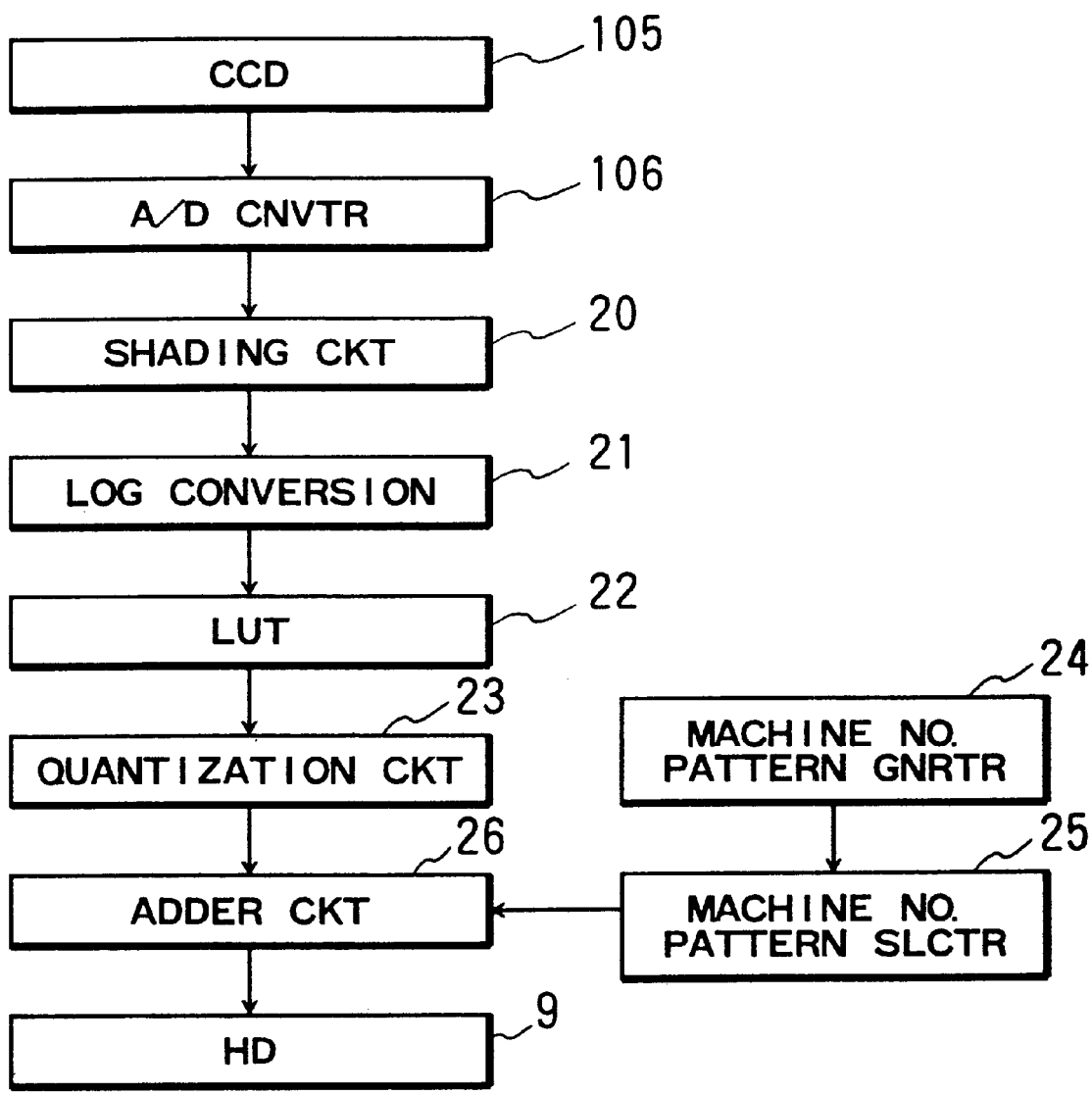
FIG. 2 is a block diagram for an image processing operation.

Referring to FIG. 2, the light reflected from the surface of an original is converted into the luminance signals by the CCD 105. These luminance signals are converted into digital luminance signals by an A/D converter 106. The thus obtained luminance signals are adjusted for the errors which result from the difference in the sensitivity among the elements in the CCD 106, by a shading circuit 20. The adjusted luminance signals are converted into density signals by an LOG conversion circuit 21.

Next, the density signals are converted by an LUT 22 so that the density of an image to be formed matches the density of the original in the γ-characteristic of a printer set at the time of printer initialization, and then, the converted signals are quantified by a quantification circuit 23.

Apart from the above described process, the most appropriate identification pattern is selected from among the apparatus identification patterns sent from an identification pattern generation circuit 24, and is added to the quantified image formation data by an adding circuit 26. Finally, the signals are sent to the head 9 to form an image. In choosing an identification pattern, it is desirable that a conspicuous pattern is selected from among the identification patterns, which generally are generated so that they correspond with numerical or alphabetical characters.

Figure 3:
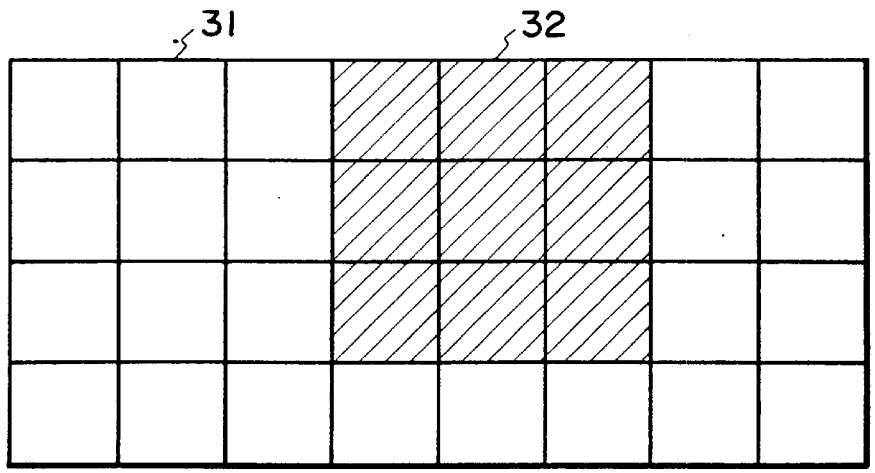
FIG. 3 is an example of an apparatus identification pattern.

FIG. 3 shows one of the identification patterns. In this case, the identification pattern is overlaid in a unit area constituted of 8×4 image elements. In the drawing, the area designated with a referential character 31 is where dots are placed, and the area designated with a referential character 32 is where no dot is placed.

Figure 4:
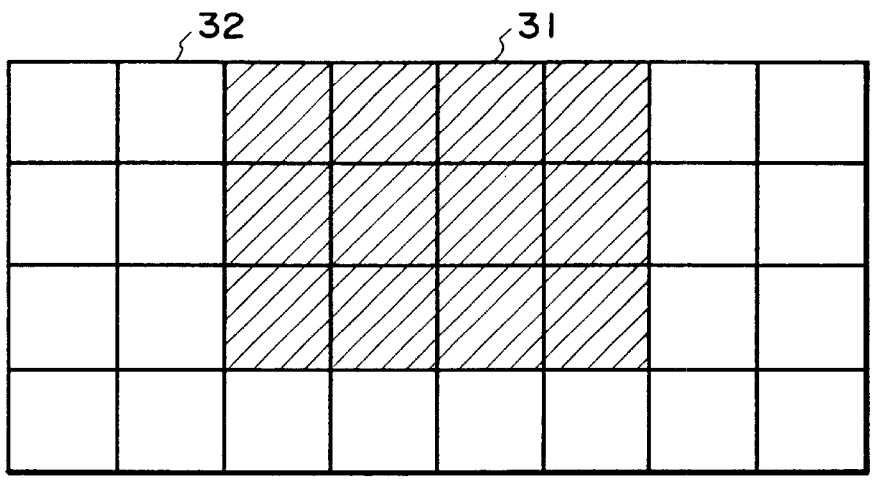
FIG. 4 is another example of an apparatus identification pattern.

If this pattern is overlaid upon the primary image formed on a sheet of ordinary paper which is not coated with a layer of ink absorbing substance, the ink bleeds, making it difficult to identify the pattern. Therefore, in the case of the ordinary paper without the ink absorbing layer, the area where dots are placed increases in size as shown in FIG. 4, so that the size of the apparatus identification pattern is increased. With this arrangement, even if the dots placed on the recording medium become blurred, the identification pattern can be clearly recognized.

Figure 5:
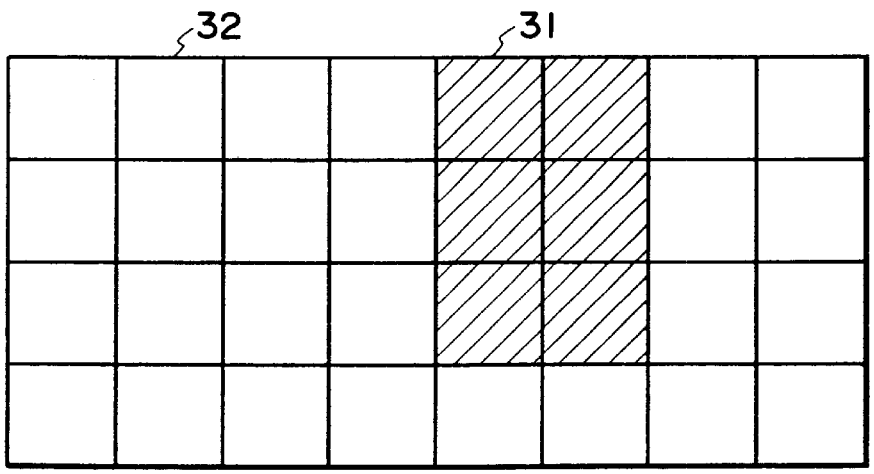
FIG. 5 is another example of an apparatus identification pattern.

On the contrary, in the case of coated paper, a dot becomes sharp at the edge, which makes the identification pattern conspicuous even to the naked eye. Therefore, the number of dots are reduced as shown in FIG. 5. With this arrangement, the overlaid pattern can be rendered inconspicuous to the naked eye while keeping the identification pattern recognizable.

The type of recording medium may be manually fed to a recording apparatus, or may be detected by a recording medium type detection circuit with which the recording apparatus is equipped. Also, it may be fed to a recording apparatus in the form of a medium type identification signal by a host apparatus such as a computer.

As described above, changing the identification pattern in accordance with the type of the recording medium assures that image quality is prevented from being reduced by the overlaid identification pattern.

Embodiment 2

This embodiment is characterized in that image quality is assured by controlling the temperature of the liquid chamber in a recording head. More specifically, the amount by which ink is ejected from the head is adjusted by controlling the temperature of the liquid chamber in the head, so that an apparatus identification pattern, which is inconspicuous to the naked eye, but is clearly identifiable with the use of a specific device, can be formed.

Figure 6:
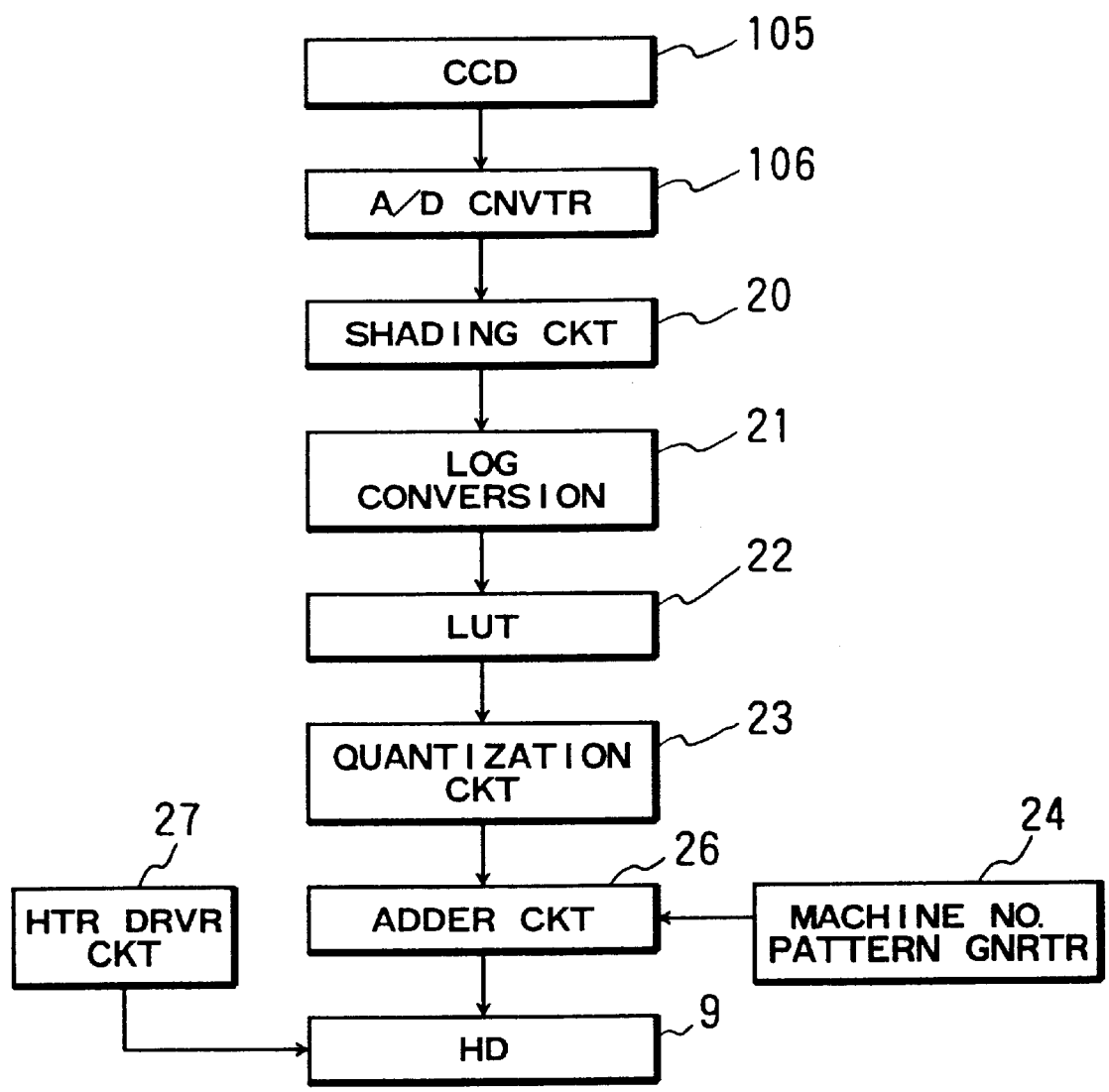
FIG. 6 is a block diagram for an image processing operation in the second embodiment of the present invention.

FIG. 6 presents the block diagram for the image processing in this embodiment.

In the first embodiment, the difference in recording medium properties is dealt with by the provision of a plurality of identification patterns. In this embodiment, the object of the present invention is accomplished by controlling the voltage applied to the temperature control heater for a recording head, with the use of a heat driver circuit 27.

Figure 7:
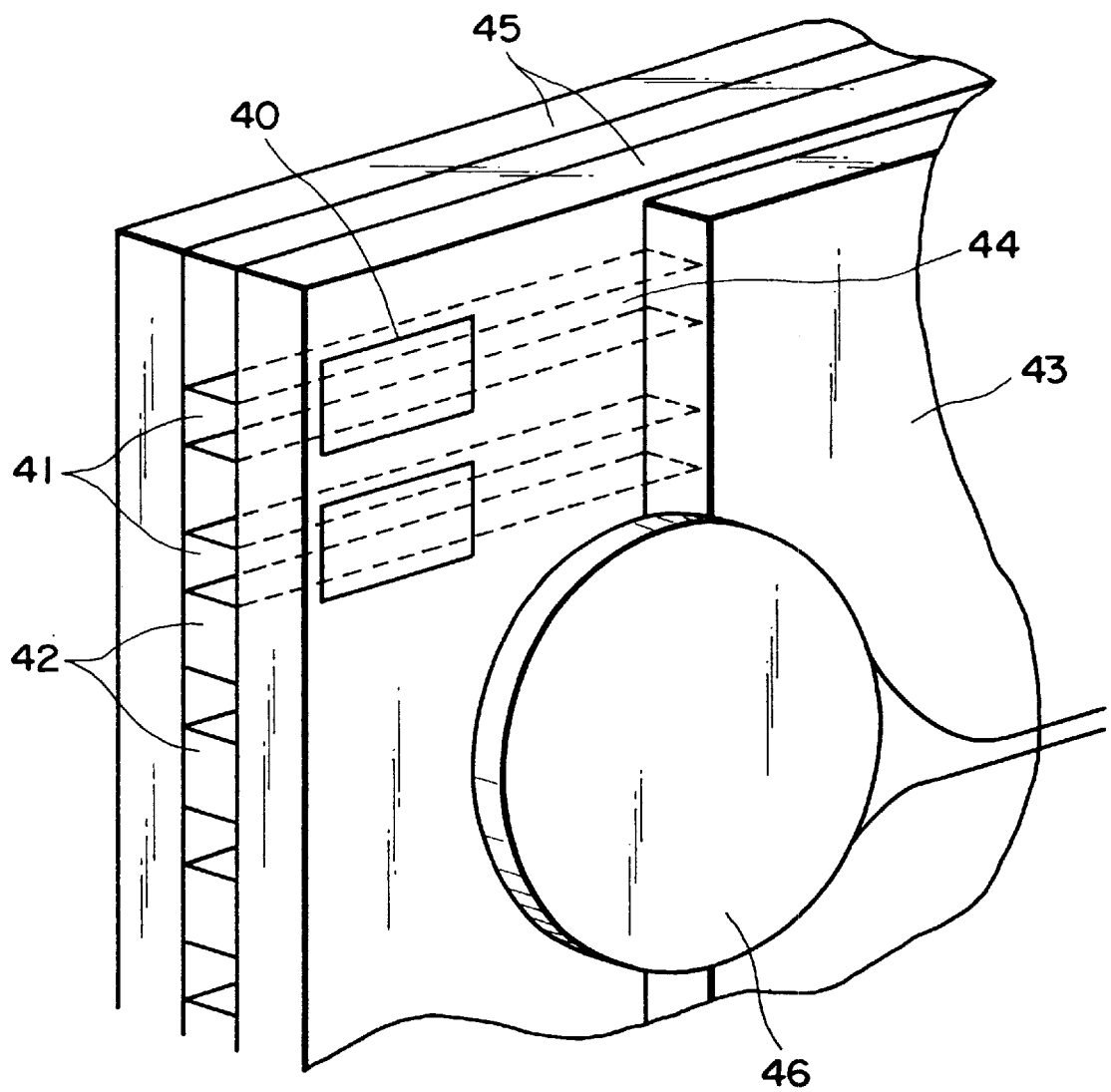
FIG. 7 is a perspective transparent drawing of the essential portion of the desirable recording head in the second embodiment.

FIG. 7 depicts the essential portion of a desirable ink jet recording head for the present invention.

The ejection orifice surface 42, which faces the recording medium with a predetermined gap, is provided with a plurality of ejection orifices 41, which are aligned at a predetermined pitch. Each of the ejection orifices 41 is connected to a common liquid chamber 43 by a liquid path 44. One of the walls of the liquid path 44 is provided with an electrothermal transducer 40 for generating the energy for ejecting ink.

There is provided an electrothermal transducer 46 for controlling the temperature of the ink in the liquid chamber and the liquid path, outside the liquid chamber. As voltage is applied to this electrothermal transducer 46, the electrothermal transducer 46 generates heat, which heats the ink within the liquid chamber, reducing the ink viscosity. As a result, the amount by which the ink is ejected increases. Consequently, a dot with a larger diameter is formed on the recording medium.

On the contrary, if the voltage applied to the electrothermal transducer 46 is reduced, ink viscosity increases. As a result, the amount by which the ink is ejected decreases. Consequently, a dot with a smaller diameter is formed.

As described above, when recording medium such as an ordinary paper is used, the dot edges become indistinct, and therefore, it becomes difficult to recognize individual dots. Thus, when such a recording medium is used, the above described method is used to increase dot size so that the apparatus identification pattern can be clearly seen.

In the case of recording medium provided with an ink absorption layer, the dot edges become sharper compared to the edges of dots formed on ordinary recording medium, that is, recording medium without an ink absorbing layer. In other words, the apparatus identification pattern becomes easier to recognize. Thus, when recording medium with an ink absorbing layer is used, the amount of the heat applied to the ink is reduced so that a recording dot with a smaller size is formed to make the apparatus identification pattern inconspicuous.

In the case of this embodiment, a recognizable apparatus identification pattern can be easily formed regardless of recording medium properties, and therefore, it is unnecessary to prepare the aforementioned various apparatus identification patterns which are used to match the pattern with the recording medium properties.

Embodiment 3

As for the color for an apparatus identification pattern, yellow is desirable, because yellow is the most inferior in terms of resolution by the naked eye. Thus, in this embodiment, an apparatus identification pattern is printed in yellow. Thus, only the voltage applied to the temperature control heater of the recording head for printing in yellow color, that is, the recording head which places the apparatus identification dots, is controlled.

Figure 8:
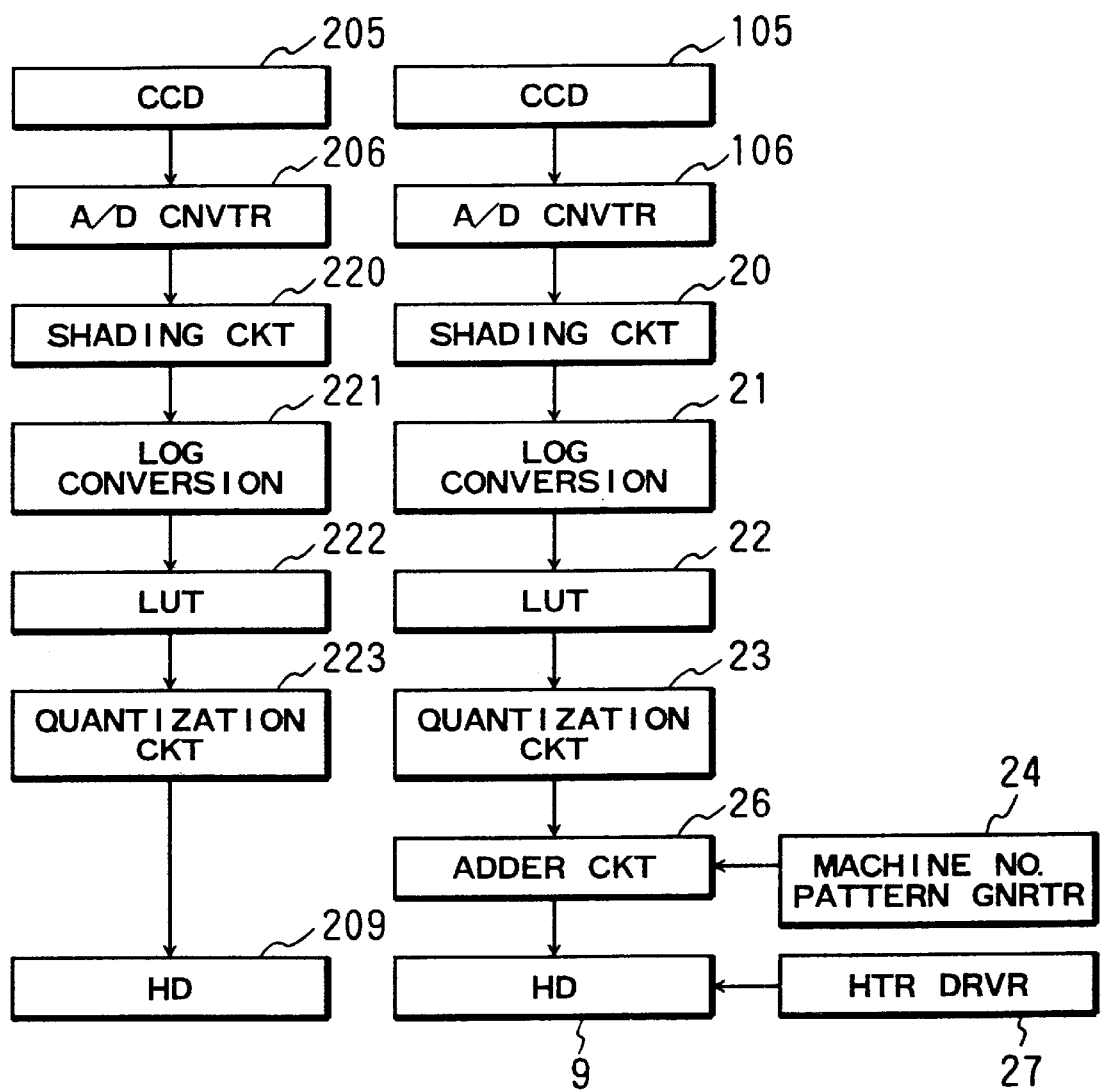
FIG. 8 is a block diagram for the image processing operation in the third embodiment.

FIG. 8 is a block diagram of the image processing in this embodiment. In the drawing, referential characters 9–106 designate the essential steps in the process for forming the dots for an apparatus identification pattern, and referential characters 205–223 designate the essential steps in the process for forming the dots for the image other than the apparatus identification pattern.

Also, in this embodiment, the diameter of a dot formed to create an apparatus identification pattern is changed to a proper size in accordance with paper type so that a reliable apparatus identification pattern is printed. However, in this embodiment, because the apparatus identification pattern is formed using only yellow ink, the voltage applied to the temperature control heater by the heater driver circuit 27 when the dots are created to form the apparatus identification pattern is controlled only in the yellow color recording head 9.

Embodiment 4

Figure 9:
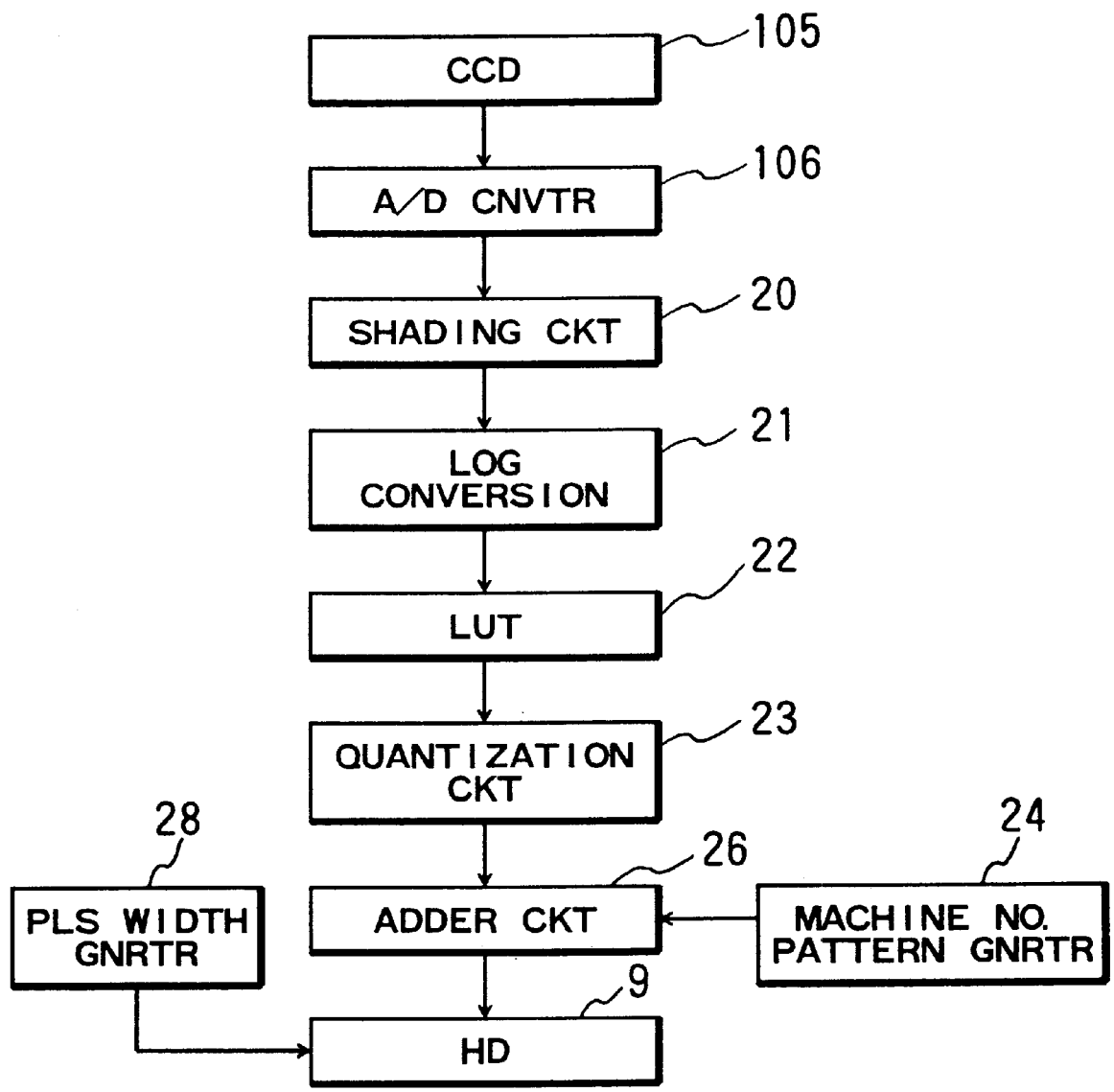
FIG. 9 is a block diagram for the image processing operation in the fourth embodiment.

In this embodiment, the amount by which ink is ejected from a recording head is more precisely controlled than in the first embodiment, by changing the wave-form of the pulse applied to the aforementioned heater to eject the ink from the recording head. With this arrangement, the dot diameter can be more precisely controlled, and therefore, a more reliable apparatus identification pattern can be overlaid on the primary image. FIG. 9 is a block diagram for the image processing process in this embodiment.

In this embodiment, in order to change the dot diameter, the width of the pulse applied to the recording head 9 is varied in accordance with the recording medium type, with the use of a pulse width setting circuit 28.

Figure 10:
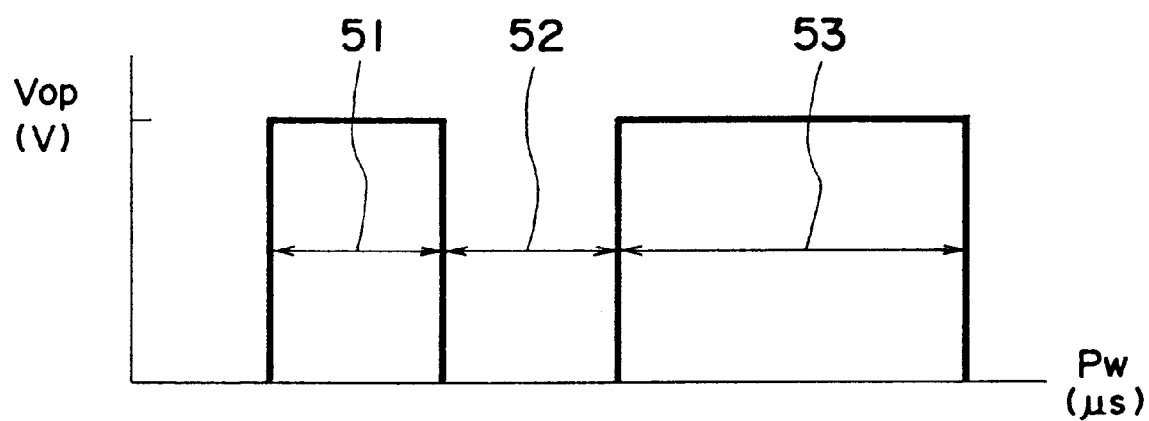
FIG. 10 is a graphic drawing which depicts the pulse width setting in the fourth embodiment.

FIG. 10 shows the wave-form of one of the pulse desirable for this embodiment.

A referential character 51 designates a pre-heat pulse; 52, an interval; and a referential character 53 designates a main heat pulse. In this embodiment, the amount by which the ink is ejected is controlled by the pre-heat pulse 51 and the interval 52, and the ink is ejected by the main heat pulse.

For example, if an image is printed on a sheet of ordinary paper, with the pre-heat pulse length set at 1.5 $\mu$sec, the diameter of each dot formed on the recording medium becomes approximately 70 $\mu$m, whereas if an image is printed on a sheet of coated paper, with the pre-heat pulse length set to the same length, or 1.5 $\mu$sec, the dot diameter becomes a slightly smaller diameter of approximately 65 $\mu$m. However, in the latter case, the formed dots are sharper at edge than in the former, making the pattern for tracing the apparatus identification, less inconspicuous. Thus, when coated paper is used as the recording medium, the length of the pre-heat pulse is set to be 1.0 $\mu$sec so that dots with a diameter substantially smaller than 65 $\mu$m are formed on the recording medium, making the apparatus identification pattern more inconspicuous.

In the case of the ordinary paper, if it is difficult to recognize an apparatus identification pattern formed on an ordinary sheet even when the pre-heat pulse width is set to 1.5 $\mu$sec, the pre-heat pulse width may be increased to 2.0 $\mu$sec to increase the dot diameter so that the apparatus identification pattern can be easily recognized.

In the case of the preceding embodiments, it was desirable that an apparatus identification pattern, or code, was printed with yellow ink or the like, so that the pattern, or code, was not recognized by the naked eye. This is because human eyes are not as sensitive to yellow color as to colors other than yellow. In order to find out the apparatus identity added to an image, all that is necessary is to observe the image through a band filter for a band width of approximate 350 nm. With the use of such a filter which allows only yellow color signals to pass, the apparatus identification pattern can be easily read.

Embodiment 5

This embodiment is similar to the third embodiment in that only the wave-form of the pulse applied to the recording head which forms the dots for an apparatus identification pattern, that is, the recording head which ejects yellow ink, is varied.

FIG. 11 is a block diagram for this embodiment. In the diagram, referential characters 9–106 designate the blocks which belong to the yellow image processing operation for recording the additional dots which forms an apparatus identification pattern, and referential characters 205–223 designate the blocks which belong to the image processing operation for recording the dots other than the additional dots.

Also in this embodiment, the width of the pulse applied to the heater is controlled by the pulse width setting circuit 28, in order to print an apparatus identification pattern formed of dots with a proper diameter for the paper type, as described above. However, in this embodiment, control is limited to the recording head which prints in yellow.

Embodiment 6

In this embodiment, the recording unit 9 of the image forming apparatus illustrated in FIG. 1 prints not only when it scans in the direction P, but also when it scans in the direction Q. In other words, the image forming apparatus in this embodiment is structured so that it can record in both directions.

Next, the recording operation carried out by the above mentioned structure will be described.

Figure 12:
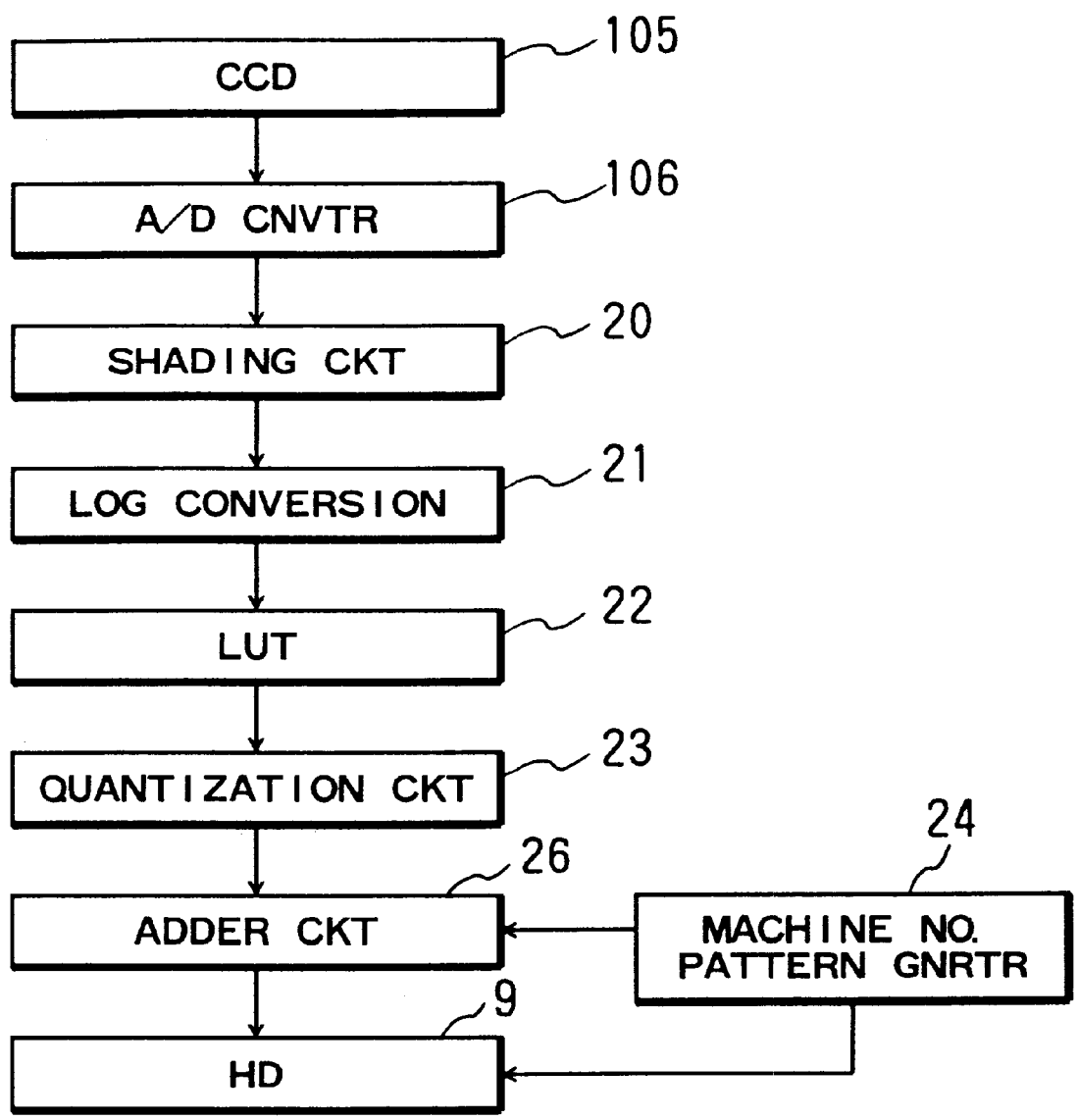
FIG. 12 is a block diagram for the image processing operation in the sixth embodiment.

Referring to FIG. 12, the pattern sent from the apparatus identification pattern generation circuit 24 is added to the quantified data by the adding circuit 26, and then is sent to the head 6, which forms an image by ejecting ink while the carriage is moving in the direction P as well as in the direction Q.

For example, if the aforementioned head is used to record an image, inclusive of an apparatus identification pattern, on such a recording medium as ordinary paper, the ejected ink can form only faint dots for the apparatus identification pattern, or dots with an indistinct edge. Thus, in this embodiment, when such a recording medium is used, an image is recorded in the following manner. First, apparatus identification pattern signals generated in the aforementioned apparatus identification pattern generation circuit 24 are added to the image formation signals sent from the quantization circuit 23, so that the apparatus identification pattern is overlaid on the primary image. Then, the head 9 is caused to scan the recording medium in the direction P while being driven by the above described integrated image formation signals.

Next, as the carriage is moved in the direction Q, the recording head 9 is driven only by the apparatus identification pattern signals generated by the apparatus identification pattern generation circuit 24, that is, the same signals as the signals added to the image formation signals to be used to drive the recording head 9 when it is moved in the direction P immediately before it begins to be driven in the direction Q. Thus, the same apparatus identification pattern is recorded on the same location across the portion of the medium covered with the immediately preceding scanning movement of the recording head 9 in the direction P. Then, the recording medium 5 is conveyed in the recording medium conveyance direction, by a distance equal to the width of the image segment just recorded by the recording head 9. These three recording steps are repeated until the entire image is completed.

With this recording arrangement, the image density is increased only for the apparatus identification pattern without reducing the recording speed. Thus, even when an image inclusive of an apparatus identification pattern is recorded on ordinary paper, an image in which the edges of the dots which form the apparatus identification pattern are not indistinct can be recorded. Therefore, the identity of the apparatus used for recording the image can be easily traced.

It is desired that an apparatus identification pattern, which is usually represented in the form of a numerical pattern, is selected from among inconspicuous numerical and/or alphabetical patterns.

The type of the recording medium may be manually fed into a recording apparatus, or it may be automatically fed into a recording apparatus, in the form of signals sent from the recording medium type detection circuit with which a recording apparatus is equipped, a host apparatus such as a computer, or the like.

Embodiment 7

This embodiment is also characterized in that the recording head is driven by the image formation signals both while it is moved in the direction P, and while it is moved in the direction Q, as it was in the sixth embodiment. However, this embodiment is different from the sixth embodiment in that while the recording head 9 is moved in the direction Q, it is driven by image formation signals different from the signals which drive it while it is moved in the direction P.

FIG. 13 is a block diagram for the recording operation in this embodiment.

In this embodiment, when an image inclusive of an apparatus identification pattern is recorded with the use of the recording head 9 described in the preceding embodiment, the signals of an apparatus identification pattern generated by the apparatus identification pattern generation circuit 24 are added, in an overlaying manner, to the image formation signals sent from the quantization circuit 23, and the recording head 9 is driven by these integrated image formation signals while it is moved in the direction P.

Next, as the carriage is moved in the direction Q, the recording head 9 is driven only by the less dense version of the apparatus identification pattern signals, that is, a version of the apparatus identification pattern, which is created by thinning down the full version of the apparatus identification pattern generated by the apparatus identification pattern generation circuit 24, by the signal thinning circuit 29 which thins down the apparatus identification pattern signals, that is, the same signals as the signals integrated with the image formation signals to be used to drive the recording head 9 when it is moved in the direction P immediately before it begins to be driven in the direction Q. Thus, a thin down version of the apparatus identification pattern is recorded on the same location across the portion of the medium covered with the immediately preceding scanning movement of the recording head 9 in the direction P.

Then, the recording medium 5 is conveyed in the recording medium conveyance direction, by a distance equal to the width of the image segment just formed by the recording head 9. These three recording steps are repeated until the entire image is completed.

Figure 14:
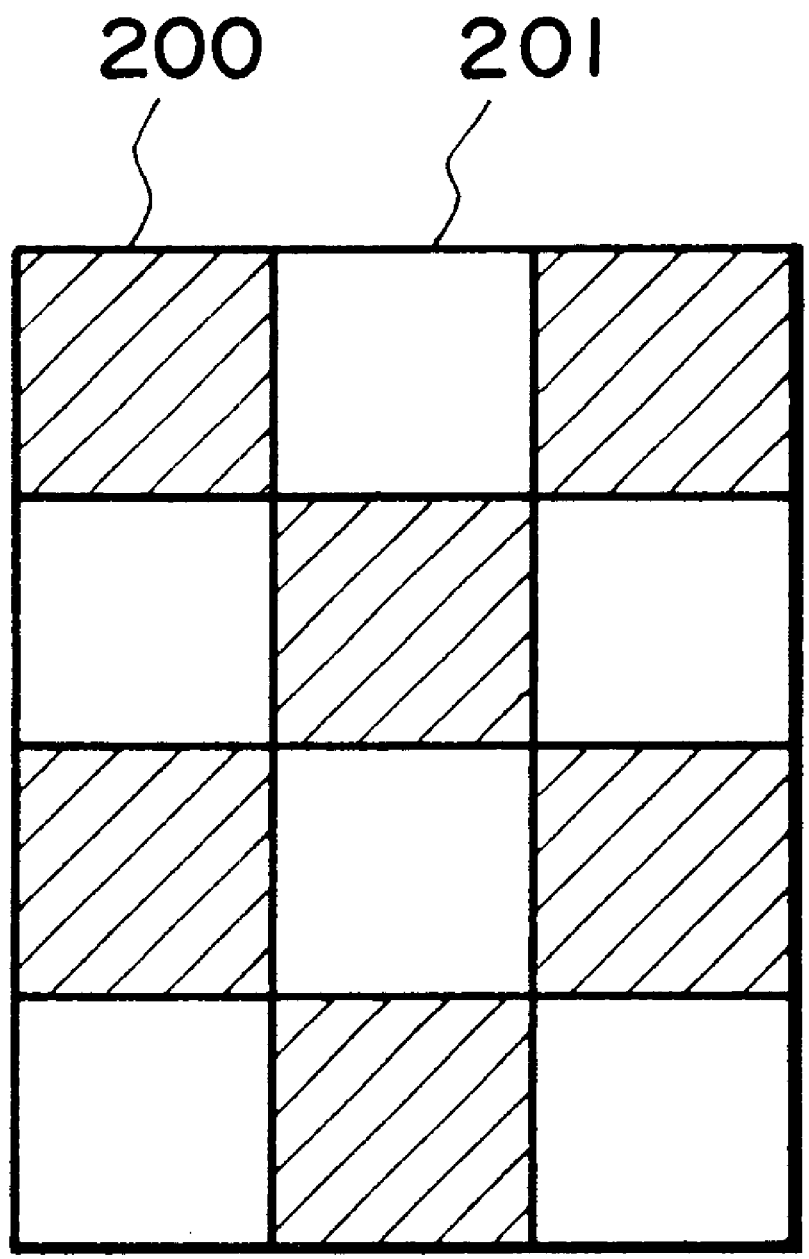
FIG. 14 is an example of a mask.

FIG. 14 presents an example of a mask which is used by the signal thinning circuit 29.

In the drawing, referential characters 200 and 201 designate picture elements to be printed and not to be printed, respectively.

When the signal thinning pattern illustrated in FIG. 14 is used by the signal thinning circuit 29 which thins out the image formation signals for the apparatus identification pattern while the recording head 9 is moved in the direction P, the dot density with which the recording head 9 forms the apparatus identification pattern while it is moved in the direction Q is half the dot density with which the recording head 9 forms the apparatus identification pattern while it is moved in the direction P. In other words, when an image inclusive of an apparatus identification pattern is recorded with the use of the above described recording head 9 and the recording method which records the same apparatus identification pattern twice, that is, once while the recording head 9 is moved in the direction P and once while the recording head 9 is moved in the direction Q, on such paper that makes the apparatus identification pattern conspicuous, the dot density is reduced while the recording head is moved in the direction Q, so that the apparatus identification pattern is recorded in such a manner that it is inconspicuous to the naked eye but can be easily recognized with the use of the aforementioned proper means.

In other words, this embodiment can deal with not only the difference between ordinary paper and coated paper, but also the differences among many other recording media.

Further, this embodiment makes it unnecessary to prepare different apparatus identification patterns for different recording media in order to prevent image quality from being reduced by the dot diameter difference which occurs due to the difference in the recording medium type.

Although, in this embodiment, the thinned down version of the apparatus identification pattern is recorded while the recording head 9 is on its return trip, it may be recorded while the recording head 9 is on its rightward trip.

Embodiment 8

Also in this embodiment, an apparatus identification pattern is recorded twice, that is, once while the recording head 9 is moved in the direction P, and once more while the recording head 9 is moved in the direction Q. In this embodiment, however, the amount by which ink is ejected while the recording head 9 is moved backward is changed so that the recorded apparatus identification pattern can be more easily recognized.

FIG. 15 is the block diagram for the recording operation in this embodiment.

When an image is formed with the use of the aforementioned head 9, the apparatus identification pattern signals generated by the apparatus identification pattern generation circuit 24 are added by the adding circuit 26, in an overlaying manner, to the image formation signals sent from the quantization circuit 23, and the recording head 9 is driven by the thus integrated image formation signals while being moved in the direction P. As a result, the first segment, or the first narrow strip, of the image inclusive of the apparatus identification pattern is formed.

Next, while the carriage is moved in the direction Q, the recording head 9 is driven only by the apparatus identification pattern signals generated by the apparatus identification pattern generation circuit 24. As a result, the portion of the apparatus identification pattern, which has been recorded during the immediately preceding run of the recording head 9 in the direction P, is recorded, in an overlaying manner, across the exact area across which the first strip of the image inclusive of the apparatus identification pattern has been recorded during the immediately preceding run of the recording head 9 in the direction P.

During this recording run of the recording head 9 in the direction Q, ink droplets with a larger volume are ejected. More specifically, electrical pulses, the width of which have been changed by a pulse width setting circuit 28 to increase the volume by which ink is ejected per ejection, are applied to the electrothermal transducers. A desirable recording head for this embodiment is the same as the one illustrated in FIG. 7.

As described above, the pulses applied to the electrothermal transducers are rendered variable in width.

FIG. 10 shows the pulse applied in this embodiment.

In the drawing, a reference character 51 designates a pre-heat pulse; a referential character 52, an interval; and a referential character designates a main heat pulse. The amount by which the ink is ejected per ejection is controlled by the pre-heat pulse 51 and the interval 52, and the ink is ejected by the main heat pulse.

For example, provided that recording medium is ordinary paper, if the width of the pre-heat pulse 51 is 1.5 μsec, dots with a diameter of approximately 70 μm are formed on the recording medium, whereas if the width of the pre-heat pulse 51 is increased from 1.5 μsec to 2.0 μsec under the same condition in terms of recording medium, dots with a diameter of approximately 80 μm are formed. In other words, if the width of the pre-heat pulse 51 is increased, the dot diameter increases.

Thus, when ordinary paper is used as the recording medium on which an image, inclusive of an apparatus identification pattern, is recorded, the width of the pre-heat pulse is set to 1.5 μsec for the period in which the recording head 9 is moved in the direction P, and 2.0 μsec for the period in which the recording head 9 is moved in the direction Q.

In other words, the dot diameter is increased by increasing width of the pre-head pulse, so that the apparatus identification pattern can be easily recognized. The pattern to be printed as the apparatus identification pattern may be any of the patterns described in the fourth and fifth embodiments.

There is another method for changing the amount by which ink is ejected per ejection. According to this method, in order to change, or control, the amount by which ink is ejected per ejection, the electrothermal transducer 46 is used to control the temperature of the entire recording head 9. Therefore, this method requires a greater amount of heat, making the recording head 9 slow in changing the amount of ink per ejection after the direction in which the recording head is moved is changed from the direction P to the direction Q. In other words, this method is not desirable in terms of the recording head response. In comparison, according to this eighth embodiment of the present invention, the width of the pulse applied to eject ink is changed to change the amount by which ink is ejected, and as a result, the amount by which ink is ejected per ejection is changed much quicker; the recording head response is superior in terms of the change in the amount ink per ejection, making this eighth embodiment is advantageous over the above described method that changes the temperature of the entire recording head.

As described in the preceding embodiments of the present invention, an apparatus identification pattern to be overlaid upon the primary image should be inconspicuous to the naked eye. Thus, based on the fact that a yellow pattern is difficult for human eye to recognize, it is recommendable that an apparatus identification pattern is formed in yellow color.

An apparatus identification pattern formed in yellow color can be easily read through a band filter with a band width of approximately 350 nm, which separates the yellow apparatus identification pattern from the primary image.

The present invention can be applied to a system which comprises a plurality of image forming apparatuses, as well as a single image forming apparatus. Further, it is needless to say that the present invention is applicable to an image formation system, or a single image forming apparatus, to which programs are externally fed.

As described above, according to the present invention, a production number specific to each copying machine is overlaid, as is, or in a coded form, over the primary pattern of a print, so that the copying machine used for a prohibited copying operation can be identified.

The pattern which represents a production number or the like is created by varying the amount by which ink is ejected per ejection so that the dots placed on a sheet of recording medium become different in diameter. Further, the amount by which ink is ejected per ejection is varied in accordance with the type of recording medium. Therefore, the primary pattern of a print is prevented from suffering from loss of image quality in terms of color reproduction.

Further, the present invention is advantageous in that is assures that the added information can be reliably read.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus for forming an image on a recording material in accordance with an input image, the image forming apparatus comprising:

generating means for generating a predetermined pattern;

superimposing means for superimposing the predetermined pattern on the input image;

forming means for forming on the recording material the input image superimposed with the predetermined pattern by said superimposing means; and control means for controlling an amount of the predetermined pattern applied on the recording material in accordance with a type of the recording material.

2. An apparatus according to claim 1, wherein said control means changes the predetermined pattern to effect its controlling operation.

3. An apparatus according to claim 1, wherein said control means controls an image forming condition of said forming means to effect its controlling operation.

4. An apparatus according to claim 3, wherein said control means changes a dot size recorded on the recording material to effect its controlling operation.

5. An apparatus according to claim 4, wherein said forming means includes a recording head for ejecting ink.

6. An apparatus according to claim 5, wherein said control means controls an amount of the ink ejected by said recording head to effect its controlling operation.

7. An apparatus according to claim 6, wherein said control means controls a temperature of said recording head to effect its control operation.

8. An apparatus according to claim 7, wherein said control means controls the temperature using a temperature controlling heater.

9. An apparatus according to claim 4, wherein said forming means includes a plurality of recording heads for ejecting different colors of ink, and wherein said generating means generates the predetermined pattern for a predetermined color.

10. An apparatus according to claim 9, wherein said control means controls a dot size on the recording material by controlling an amount of ink ejected only for the predetermined color.

11. An apparatus according to claim 10, wherein said control means controls an amount of ink ejected only for the recording head for ejecting the ink of the predetermined color.

12. An apparatus according to claim 11, wherein said control means controls a temperature only of the recording head for ejecting the ink of the predetermined color to control the amount of ink ejected.

13. An apparatus according to claim 10, wherein said control means controls pulses applied only to the recording head for ejecting the ink of the predetermined color to control the amount of ink ejected.

14. An apparatus according to claim 1, wherein said control means controls pulses applied to a heater for ejecting ink.

15. An apparatus according to claim 1, wherein said control means applies the predetermined pattern a plurality of times.

16. An apparatus according to claim 1, wherein the predetermined pattern is peculiar to the individual image forming apparatus.

17. An image forming method for forming an image on a recording material in accordance with an input image, the image forming method comprising the steps of:
   generating a predetermined pattern;
   superimposing the predetermined pattern on an input image;
   forming on the recording material the image superimposed with the predetermined pattern in said superimposing step;
   controlling an amount of the predetermined pattern applied on the recording material in accordance with a type of the recording material.

18. An image forming apparatus for forming an image in accordance with an input image on a recording material, the image forming apparatus comprising:
   generating means for generating a predetermined pattern signal;
   superimposing means for superimposing the predetermined pattern signal on the input image;
   forming means for forming on the recording material the image superimposed with the predetermined pattern signal by said superimposing means;
   control means for controlling said forming means in accordance with a type of the recording material to form the predetermined pattern signal a plurality of times on the recording material.

19. An apparatus according to claim 18, wherein said forming means includes a recording head for forming the image through a serial scan.

20. An apparatus according to claim 19, wherein said control means controls said forming means to form the predetermined pattern signal through two serial scans.

21. An apparatus according to claim 20, wherein said control means controls said forming means to form the predetermined pattern signal through forward and backward serial scans.

22. An apparatus according to claim 21, wherein said generating means generates a first predetermined pattern signal for the forward serial scan and a second predetermined pattern signal for the backward serial scan.

23. An apparatus according to claim 22, wherein said generating means generates the first and second predetermined pattern signals in accordance with a type of the recording material.

24. An apparatus according to claim 20, wherein said recording head forms the image by ejecting ink, and said control means controls the recording head to provide different amounts of ejected ink in a forward serial scan and a backward serial scan.

25. An apparatus according to claim 24, wherein said control means controls the recording head to provide the different amounts of ejected ink in accordance with a type of the recording material.

26. An apparatus according to claim 25, wherein said control means controls ejection pulses applied to a heater for ejecting the ink.

27. An apparatus according to claim 18, wherein the predetermined pattern signal is peculiar to the individual image forming apparatus.

28. An image forming method for forming an image in accordance with an input image on a recording material, the image forming method comprising the steps of:
   generating a predetermined pattern signal;
   superimposing the predetermined pattern signal on the input image;
   forming on the recording material the image superimposed with the predetermined pattern signal in said superimposing step; and
   controlling said forming means in accordance with a type of the recording material to form the predetermined pattern signal a plurality of times on the recording material.

* * * * *

UNITED STATES PATENT AND TRADEMARK OFFICE
CERTIFICATE OF CORRECTION

PATENT NO. : 6,473,200 B1
DATED : October 29, 2002
INVENTOR(S) : Nobuhiko Ogata

It is certified that error appears in the above-identified patent and that said Letters Patent is hereby corrected as shown below:

<u>Title page, Item [54] and Column 1, line 1,</u>
Title, "APPARATUS METHOD" should read -- APPARATUS AND METHOD --.

<u>Column 1,</u>
Line 22, "identify" should read -- identity --.

<u>Column 4,</u>
Line 4, "cable" should read -- cable to --.

<u>Column 9,</u>
Line 42, "thin" should read -- thinned --.

<u>Column 12,</u>
Line 12, "is" should read -- it --.

Signed and Sealed this

Ninth Day of December, 2003

JAMES E. ROGAN
*Director of the United States Patent and Trademark Office*